Oct. 16, 1923.
E. R. WILLIAMS
CHANGE SPEED GEAR
Filed Feb. 3, 1922
1,471,228
3 Sheets-Sheet 1
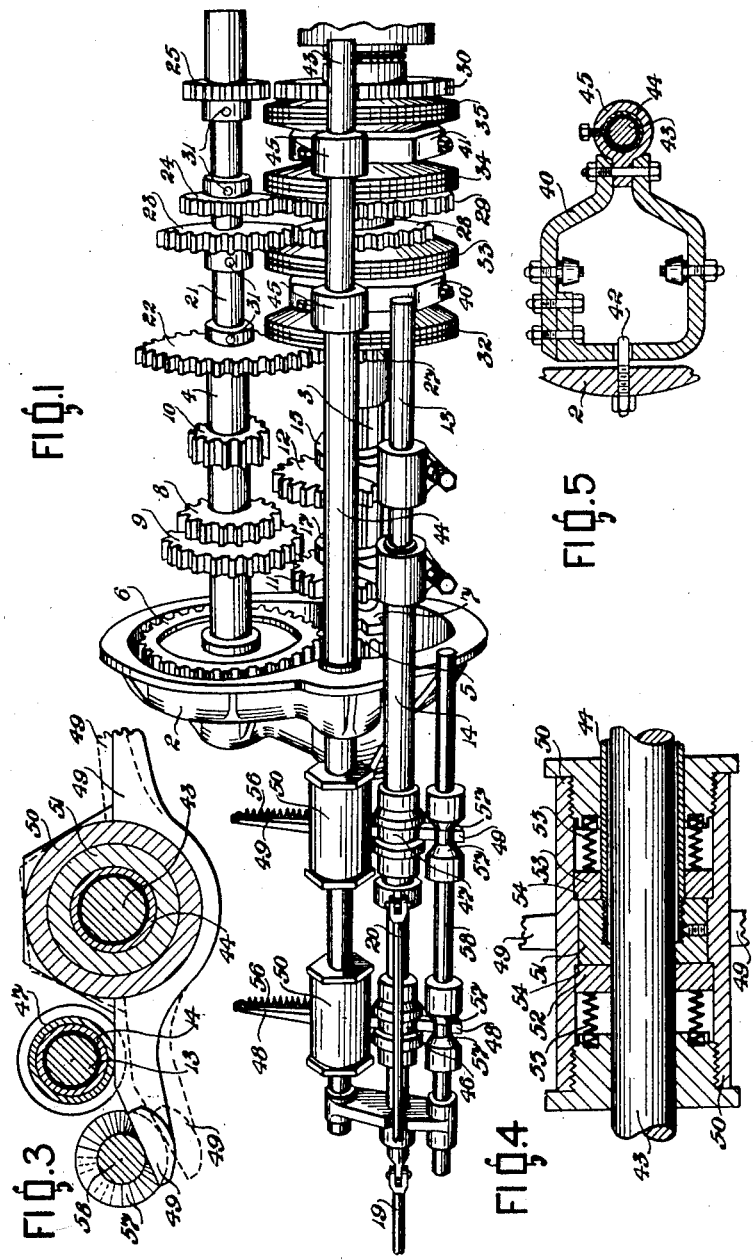
INVENTOR:
Edgar R. Williams
By Wm Wallace White
ATT'Y.

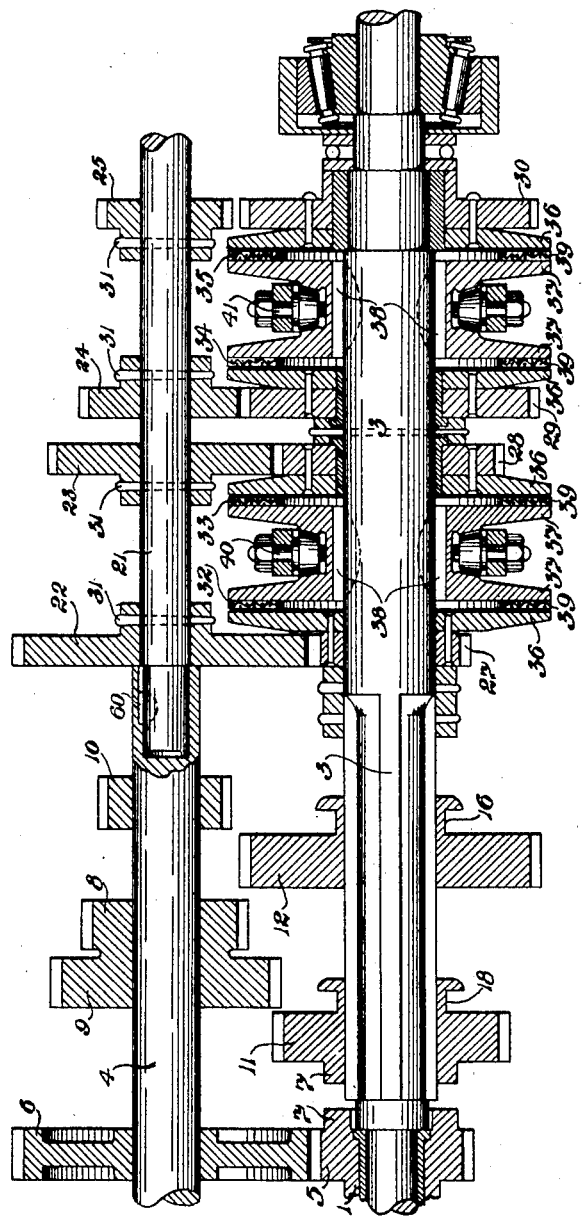

Oct. 16, 1923.

E. R. WILLIAMS

CHANGE SPEED GEAR

Filed Feb. 3, 1922

INVENTOR:
Edgar R. Williams
By Wm Wallace White
ATTY.

Patented Oct. 16, 1923.

1,471,228

UNITED STATES PATENT OFFICE.

EDGAR RICHARD WILLIAMS, OF ADDINGTON, CHRISTCHURCH, NEW ZEALAND.

CHANGE-SPEED GEAR.

Application filed February 3, 1922. Serial No. 533,790.

*To all whom it may concern:*

Be it known that I, EDGAR RICHARD WILLIAMS, a subject of the King of Great Britain, residing at 68 Whiteleigh Avenue, Addington, Christchurch, in the Dominion of New Zealand, have invented new and useful Improvements in and relating to Change-Speed Gears, of which the following is a specification.

This invention relates to change-speed gear and although especially adapted to the requirements of motor-vehicles, is applicable also to change-speed gear employed in connection with other forms of machinery.

The invention relates to that form of gear wherein the change is effected by bringing into mesh with one another gear-wheels mounted upon a main-shaft and counter-shaft.

In the case of gears of this nature it is desirable that the two wheels when about to intermesh, should be revolving at the same tooth-speed as otherwise their engagement will be accompanied by considerable noise and shock, which results in more or less injury to the teeth. In the event of there being serious disparity between their respective tooth-speeds, it may even be impossible to get the wheels to intermesh at all.

The correct performance of this operation, more particularly in the case of a motor-vehicle, requires considerable skill and judgment on the part of the driver in manipulating the change-lever by means of which the engagement of the gears is effected and the clutch by means of which the driving shaft is connected and disconnected with the engine or other source of power.

It is the object of the present invention however to provide means whereby, during the process of changing gears, the incoming pair of wheels before intermeshing, will be positively and defintely brought to the required relative speeds as already mentioned, thus ensuring a certain and noiseless change. By the use of the present invention a change of gears may safely be effected under conditions which according to hitherto existing practice, would be impossible or hazardous.

Thus, for example, a car may be placed in gear during the process of coasting down hill in neutral, or again the reverse gears may be brought into mesh before the car has actually stopped its forward movement.

In carrying this object into effect the present invention consists essentially of the provision, in addition to the ordinary or main gears, of a set of subsidiary gears of the same ratios as the main gears and adapted to temporarily connect between the main-shaft and the counter-shaft when the main gears are about to engage. The said subsidiary gears consist either of trains of gear wheels permanently in mesh or chain gears.

In order that they may become operative only when required the wheels of the subsidiary gears or one in each train is rotable upon its shaft and suitable friction clutches are provided for connecting such wheels to their shaft or shafts when required for the purposes of the invention.

The said friction-clutches are controlled and operated automatically by and in conjunction with the means employed for manipulating the main gears.

In order that the nature of the invention and its construction may be clearly understood, reference will now be made to the accompanying drawings in which:—

Fig. 1 is a perspective view illustrating an application of the invention to a known type of change-speed gear.

Fig. 2 is a longitudinal section on a somewhat larger scale, through the main and counter shafts as shown in Fig. 1.

Fig. 3 is a cross-section through the operating-rods of the main and subsidiary gears, the engaged condition being shown in full lines while the disengaged condition is indicated in dotted lines.

Fig. 4 is a longitudinal section through a portion of the operating rods of the subsidiary gears illustrating portions of the means employed for inter-connecting one of such rods with the corresponding rod of the main gears.

Fig. 5 shows in detail one of the yokes employed in operating one of the friction clutches of the subsidiary gears.

Figure 6:
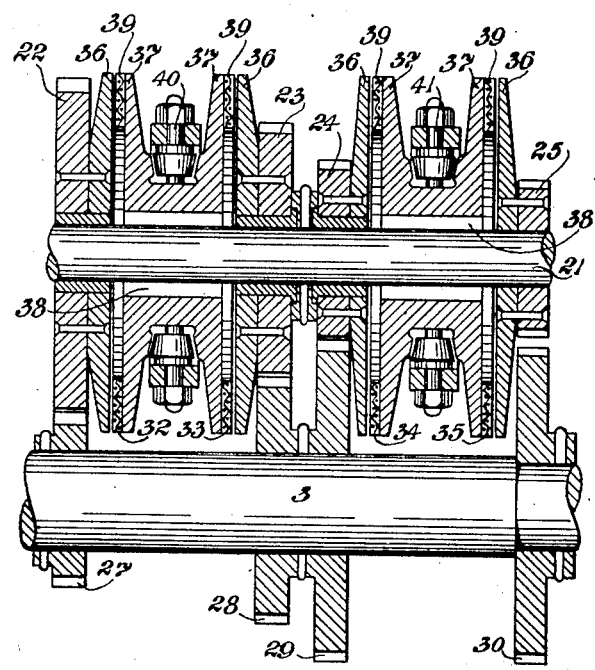
Fig. 6 is a longitudinal section of a portion of the main shaft and counter-shaft showing the friction clutches mounted upon the counter-shaft instead of on the main shaft as in Fig. 2.

The invention is here shown applied to a known construction of motor-car transmission gear and comprising a shaft 1 the forward end of which is connected through the driving clutch with the engine, while the rear end of such shaft enters the forward end of the gear-box 2, a portion of which is shown in Fig. 1.

Within the said gear-box are rotatably mounted a main shaft 3 disposed in line end-for-end with the shaft 1 and adapted to transmit power from the latter to the cardan or propellor shaft of the car, and a counter-shaft 4 arranged in parallel relation to the said shaft 3.

The counter-shaft 4 is connected with the shaft 1 so as to be rotated thereby through the medium of the constantly meshing gear wheels 5 and 6 and such shaft 1 is also provided with one member of a dog-clutch 7 the other member of which is slidably carried upon the shaft 3 in order that the said clutch may be engaged or disengaged, thereby connecting or disconnecting such shafts 1 and 3.

Fixedly mounted upon the counter-shaft 4 are three gear-wheels, viz: a low gear wheel 8, an intermediate gear-wheel 9 and a reverse gear-wheel 10, the latter being arranged permanently in mesh with an idler gear-wheel not shown.

The portion of the main shaft corresponding with that of the counter-shaft upon which the said wheels are mounted, is splined to slidably carry two gear-wheels viz: a gear-wheel 11 adapted to be slid into mesh with the gear-wheel 9 and to which gear wheel 11 is attached the slidable member of the dog-clutch 7 and a gear-wheel 12 adapted to be slid into mesh with either the gear wheel 8 or the said idler gear-wheel meshing with the gear-wheel 10.

The arrangement is such that if the shaft 1 is rotated the counter-shaft 4 will be rotated thereby, while the wheels 11 and 12 and the slidable member of the clutch 7 are in their neutral positions as here shown however the shaft 3 will remain at rest.

If the wheel 12 is slid in a forward direction into mesh with the wheel 8 the shaft 3 will be rotated by such wheels 8 and 12 in the same direction as the shaft 1 which combination constitutes the low forward gear of the car, while by sliding the wheel 12 in a rearward direction so as to come into mesh with the aforementioned idlerwheel meshing with the wheel 10, the shaft 3 will thereby be rotated in the opposite direction thus providing the reverse or backward drive of the car.

Again if, while the wheel 12 occupies its neutral position, the wheel 11 is slid in a rearward direction so as to come into mesh with the wheel 9 the shaft 3 will thereby be rotated in the first mentioned direction thereby constituting the intermediate gear, while by sliding such wheel 11 in a forward direction so as to cause the slidable member of the dog-clutch 7 to engage the other member of the latter, the shaft 3 will be coupled directly to the shaft 1 thereby constituting the direct or top-gear drive.

The means employed for effecting these manipulations consists of two rods 13 and 14 respectively disposed parallel with the said shafts and each adapted to independent longitudinal sliding movement, the rod 13 being arranged concentric with the rod 14 and adapted to perform its said sliding movement therethrough.

Fixedly carried upon the rod 13 is a fork or yoke 15 which engages within a circumferential groove 16 provided in the boss of the wheel 12 and similarly upon the rod 14 is fixedly mounted a fork or yoke 17 which engages within a circumferential groove 18 in the boss of the wheel 11.

The forward end of the rod 13 is connected by means of a connecting rod 19 with the customary gear-change lever operable by the driver of the vehicle and similarly the forward end of the rod 14 is connected by means of a connecting rod 20 with such lever.

Thus far the construction is already known to the art to which it appertains.

According to the present invention, there is provided a series of subsidiary gears corresponding in number with said main gears, each consisting of a constantly meshing train of wheels or a chain gear and each potentially capable of operating the driven shaft 3 from the driving shaft 1 in a direction and at a speed ratio of such shafts 1 and 3 identical with that produced by the said main gears, one subsidiary gear corresponding with each main gear.

As here shown this purpose is effected by providing upon the counter-shaft 4 or upon a separate counter-shaft or any extension of the shaft 4 as 21, four gear-wheels namely 22, 23, 24 and 25 to correspond with the four main gears hereinbefore mentioned.

Upon the main driven shaft 3, or an extension thereof, are provided a series of four gear-wheels namely, a wheel 27 arranged in constant mesh with the wheel 22, a wheel 28 in constant mesh with the wheel 23, a wheel 29 in constant mesh with the wheel 24, and a wheel 30 in constant mesh with an intermediate or idler wheel (not shown) and which idler wheel is also in constant mesh with the wheel 25.

The subsidiary gear train 22 and 27 corresponds with the highest of the aforesaid gears produced by connecting the driven shaft 3 directly with the driving shaft 1 by means of the dog-clutch. The said gear train 22 and 27 will therefore be such as to be capable of rotating the shaft 3 in the same direction and at the same speed as the shaft 1.

The subsidiary gear train 23 and 28 corresponds with the second or intermediate main gear-train 9 and 11 and consequently the said gear-train 23 and 28 will be such as to be capable of rotating the shaft 3 in the same direction and at the same speed ratio to the driving shaft 1 as the said main gear to which it corresponds.

In a similar manner the subsidiary gear train 24 and 29 corresponds with the main train 8 and 12, and the subsidiary gear train including the wheels 25 and 30 corresponds with the reverse gear-train of the main gear including the wheels 10 and 12.

The said subsidiary gear-trains are normally inoperative, that is to say they are normally stationary or run idly without driving the shaft 3 but the arrangement is such that each of the subsidiary gear-trains will be rendered operative for the purpose of driving the shaft 3 when its corresponding main gear is about to be brought into use.

For this purpose the said wheels of the subsidiary gears are normally adapted to revolve upon either or both of the shafts 21 and 3 and friction clutches are provided in order to cause such wheels to revolve with their said shafts when required for the purpose of the invention as above explained.

Thus for example, as here shown in Figs. 1 and 2 the wheels 22, 23, 24 and 25 are fixedly secured to the shaft 21 as by means of pins 31 while the wheels 27, 28, 29 and 30 are revolvable upon the shaft 3 and are adapted to be connected individually thereto by means of friction clutches 32, 33, 34 and 35 respectively.

Again, as shown in Fig. 6, the same purpose is effected by securing the wheels 27, 28, 29 and 30 fixedly to the shaft 3 while the wheels 22, 23, 24 and 25 are revolvable upon the shaft 21, in which case the friction clutches 32, 33, 34 and 35 will be mounted upon the shaft 21 and adapted to individually connect thereto the wheels 22, 23, 24 and 25.

Or again, the same purpose may be effected as previously mentioned by making both sets of wheels revolvable upon their shafts 3 and 21 in which case friction clutches will be provided upon both of said shafts.

The said friction-clutches may be of any suitable construction.

As here shown (Figs. 2 and 6) each of such clutches consists of a pair of plates or members 36 and 37 arranged side by side, and adapted to come into and out of frictional engagement with each other, the plate 36 being fixedly attached to so as to rotate with the gear-wheel it is designed to control while the plate 37 is so mounted upon the shaft as to rotate therewith and to be capable of sliding movement endwise thereon for the purpose of coming into and out of frictional engagement with its corresponding plate 36. As here shown this purpose is effected by providing the shaft with suitable feathers 38 which are slidably received in suitable feather-ways in the plates 37.

In the construction here shown the slidable plates 37 of the clutches 32 and 33 are arranged adjacent to and formed integral with each other and similarly the plates 37 of the clutches 34 and 35 are adjacent and integral.

In order to provide satisfactory frictional surfaces, the plates 37 are provided with linings 39 of leather, fabric, or other suitable material, by means of which the said engagement with the plates 36 is effected.

For the purpose of effecting the engagement and disengagement of the said clutches two yokes 40 and 41 are provided, the yoke 40 being adapted to operate the plates 37 of the clutches 32 and 33 while the yoke 41 is adapted to similarly operate the plates 37 of the clutches 34 and 35.

As here shown (Fig. 5) each of the yokes 40 and 41 is fulcrumed loosely upon a pin 42 attached to the casing 2 of the gear-box, the arrangement being such as to permit of the yokes being swung slightly in forward and rearward direction upon their said fulcrums 42 for the purpose of causing their corresponding clutches to engage or disengage.

For the purpose of controlling the said movements of the yokes, a pair of rods 43 and 44 are provided and disposed parallel with the said shafts, each of such rods being adapted for independent sliding movement in a longitudinal direction.

As here shown the said rods are arranged concentric with each other, the rod 43 passing axially through the rod 44 in a manner similar to that of the rods 13 and 14 aforementioned.

To the rearward portion of the rod 44 is connected by means of a suitably articulated connecting member 45 the yoke 40, while by similar means the rearward portion of the rod 43 is connected to the yoke 41.

The rods 43 and 44 are arranged to be operated respectively by the movements of the rods 13 and 14 in such a manner that as either of the last said rods is moved by the gear-lever for the purpose of bringing one of the main gears into use, the rod 43 or 44 as the case may be, will thereby be operated so as to cause the clutch controlling the equivalent subsidiary gear to first engage and so bring such subsidiary gear into use and then disengage and so restore such subsidiary gear to its normal inoperative condition.

For this purpose upon the forward portion of the rod 13 is fixedly arranged a collar or other formation having a groove or notch 46 and similarly upon the forward portion of the rod 14 is fixedly arranged a like formation having a groove 47.

The rod 43 is provided with arm 48 adapted to enter the groove 46 and be engaged thereby and similarly the rod 44 is provided with an arm 49 adapted to enter and be engaged by the groove 47.

The said attachment of the arms 48 and 49 to their respective rods 43 and 44 is such as to permit of such arms turning axially in relation to their rods and moving slightly in a longitudinal direction thereon so as to operate their rods through the medium of cushioning springs.

For this purpose each of such arms 48 and 49 is attached to or formed integral with a box or cylinderical casing 50 so carried upon its said rod as to be capable of turning axially thereon and sliding thereon in a longitudinal direction. Within each of the said boxes 50 (Fig. 4) and positioned at or about mid-way of the two ends thereof is a collar 51 fixedly secured to the rod 43 or 44 as the case may be, but adapted to permit the box to turn axially or slide longitudinally in relation to it.

Arranged one on either side of the said collar 51 and adapted to contact therewith when such collar is in its normal or central position within the box, are a pair of collars or rings 52 and 53 each of which is longitudinally slidable in relation both to the rod and the box 50 in which it is contained. The latter is however provided with internal shoulders 54 which serve to limit the inward movement of the collars 52 and 53 relative to the central or intermediate portion of the box, while interposed between the outer faces of each of the collars 52 and 53 and the respective adjacent end-members of the box 50 are compression springs 55.

The arrangement is such therefore that if the box 50 is moved in a forward direction, that is to say to the left as here shown, such movement will be transmitted through one set of the said springs 55 and the collar 53 to the collar 51 thereby causing or tending to cause a similar movement of the rod to which the latter is attached. In a like manner a movement of the box 50 in the other or rearward direction, that is to say to the right as here shown, causes a similar co-operation of the other set of springs 55, collar 52 and collar 51 to produce or tend to produce a corresponding movement of the rod.

The arrangement is such however that but a slight movement of the rods 43 and 44 in either direction from their normal positions will bring the plate 37 of one of the aforementioned clutches into engagement with its corresponding plate 36. When this stage is reached the box 50 in continuing its movement will slide relative to the collar 51 thereby increasing the compression of one set of springs which latter will in consequence through their slidable collar, 52 or 53 as the case may be, impart an increased pressure, which, acting through the collar 51 and the rod connected thereto, will cause the members of the engaged clutch to bear against one another with a suitable degree of pressure.

Each of the arms 48 and 49 is provided with a suitable spring as 56 which is anchored to a suitable fixed point and tends to turn such arm and its box axially in the required direction to engage the groove 46 or 37 as the case may be.

For the purpose of releasing the rods 43 and 44 and so permitting the friction clutches to disengage and render the subsidiary gears again inoperative at the required stage in the operation of the main gear, there are provided and arranged stationary on either side of each of the arms 48 and 49 cams or inclined surfaces 57. The arrangement is such that as the said arms perform their said longitudinal movement in either direction they will come in contact with one or other of the said cams which latter will operate the arms and their boxes axially in opposition to their said springs 56 and thus carry such arms out of the grooves 46 or 47 as the case may be.

In the preferred form of the construction this purpose is effected by providing a stationary shaft or rod 58 disposed parallel with the aforesaid shafts and rods and upon which shaft 58 are mounted collars presenting to the said arms surfaces of conical or gradually increasing diameter to constitute the said cams.

By adjusting the positions of the collars containing the inclined surfaces 57 longitudinally upon the rod 58, the releasing of the arms 48 and 49 from the grooves 46 or 47 and the consequent disengaging of the clutches may be caused to take place at a desired stage in the operation of changing the main gears.

The setting may be such as to cause the subsidiary gears to become inoperative before the incoming main gears actually engage or the setting may be such as to produce an overlapping action, that is to say the subsidiary gear will not be thrown out of operation until the main gear has come into engagement or commenced such engagement.

In cases where no such overlapping action occurs the shaft 21 may form an integral part of the counter-shaft 4 or may be connected fixedly thereto in any suitable manner as by means of a key 60 as here shown in Fig. 2.

In cases where such overlapping action occurs, however, it is necessary or desirable to provide the shaft 21 with a slight amount of torsional freedom, as otherwise it might be impossible for the main gears to come into mesh.

This torsional freedom is preferably provided by applying the rotary motion of the shaft 1 to the shaft 21 through a spring-drive adapted to permit the shaft 21 to turn independently for a distance of say one tooth of its wheels in either direction.

Figure 7:
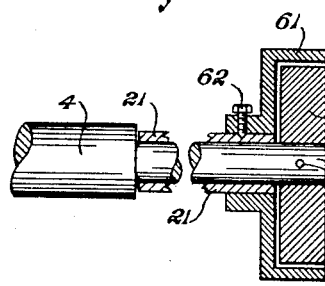
Fig. 7 shows in longitudinal section one practical means for so driving the counter-shaft of the subsidiary gear as to permit such shaft a slight amount of torsional freedom.
Figure 8:
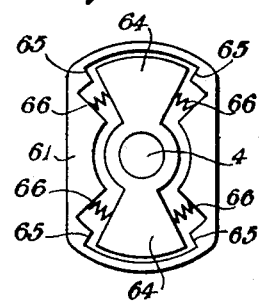
Fig. 8 is an end view of the device shown in Fig. 7.

This spring-drive may take any suitable form such for example as that shown in Figs. 7 and 8, and consisting of a member 61 mounted upon the shaft 21 and fixedly attached thereto in any suitable manner as by means of a set-screw 62, while fixedly attached to the counter-shaft 4 in any appropriate manner, as by means of a pin 63, is a member 64 arranged within the member 61.

The said member 64 is adapted to turn axially in relation to the member 61 within limits provided by stops 65 in the latter and suitable springs 66 are arranged in compression to oppose the said turning movement.

In the cases where this device is employed the shaft 21 may conveniently take the form of a sleeve loosely mounted upon a portion of the shaft 4 which portion may be suitably reduced in diameter as here shown.

If so desired the shaft 21 instead of being connected to the shaft 4 may be operated through suitable gearing directly from the shaft 1 in a manner similar to that of such shaft 4.

In such cases the shaft 21 will be connected with its driving-gear either rigidly or through a spring-drive as considered necessary or advisable.

The operation of the invention is as follows:—

Upon the rods 13 or 14 being operated by means of the gear-lever for the purpose of bringing any of the main gears into engagement in the customary manner, the resulting movement of the groove 46 or 47 will through its engagement with the arm 48 or 49 serve to so operate the rod 43 or the rod 44 as the case may be as to render operative the subsidiary gear corresponding with the main gear about to engage.

This action occurs during the first portion of the movement of the lever so that the subsidiary gear becomes operative and serves to bring the shafts to the correct relative speeds for the engagement of the main gears while the latter are still passing through their neutral position.

As the lever continues its movement the main gears will be brought into engagement while the action of the inclined surfaces 57 will, either before or after such engagement takes place, disengage the arm 48 or 49 from its notch 46 or 47 as the case may be thereby permitting the subsidiary gear to again resume its inoperative condition.

As the main gear is returned to its neutral condition by the usual operation of the lever, the groove will thereby be restored to its original position and thus re-engage the arm in readiness to again operate the subsidiary gear in the manner already explained.

This inter-action of the subsidiary and main gears takes place each time a changing of the main gears is effected and consequently by the use of the invention the difficulties of bringing the shafts to the correct relative speeds for the engagement of the main gears will be eliminated.

I claim:

1. In selective change-gear the combination with a main driving-shaft, a counter-shaft rotated thereby, a main driven-shaft, a series of selectively engageable main gears whereby said driven shaft may be driven at a variety of speeds by and relative to said driving-shaft and counter-shaft, and operable means for governing said engagement and selection, of means whereby said shafts are brought to the correct relative rotations when any of said main gears are about to engage, comprising a corresponding series of subsidiary gears each potentially capable of connecting said shafts to rotate at the same relative speeds and directions as its corresponding main gear, friction clutches whereby each of said subsidiary gears may be rendered operative to so connect said shafts, a tubular member carrying means for controlling certain of said friction-clutches, a rod passing through said tubular member and carrying means for controlling the remaining friction-clutches, and means whereby said controlling means are selectively operated by said governing means in such manner that the corresponding subsidiary gear will be rendered first operative and then inoperative during the operation of said governing means in bringing any of the main gears into engagement.

2. In selective change-gear the combination with a main driving-shaft, a counter-shaft rotated thereby, a main driven-shaft, a series of selectively engageable main gears whereby said driven-shaft may be driven at a variety of speeds by and relative to said driving-shaft and counter-shaft, and oper able means for governing said engagement and selection, of means whereby said shafts are brought to the correct relative rotations when any of said main gears are about to engage, comprising a corresponding series of subsidiary gears each potentially capable of connecting said shafts to rotate at the same relative speeds and directions as its corresponding main gear, friction-clutches whereby each of said subsidiary gears may be rendered operative to so connect said shafts, a tubular member carrying means for controlling certain of said friction-clutches, a rod passing through said tubular member and carrying means for controlling the remaining friction-clutches, each of said controlling members carrying a member mounted for rotary movement thereon, an operating member rigid with said rotary member and normally in engagement with said governing means, and means in the path of movement of said operating member for disengaging it from the governing means at a predetermined time.

3. In selective change-gear the combination with a main driving-shaft, a counter-shaft rotated thereby, a main driven-shaft, a series of selectively engageable main gears whereby said driven-shaft may be driven at a variety of speeds by and relative to said driving-shaft and counter-shaft and operable means for governing said engagement and selection, of means whereby said shafts may be brought to the required relative rotations when any of said main gears are about to engage comprising a corresponding series of subsidiary gears each potentially capable of connecting said shafts to rotate at the same relative speeds and directions as its corresponding main gear, friction-clutches whereby each of said subsidiary gears may be rendered operative to so connect said shafts, means for controlling said friction-clutches operable by said governing means to render the corresponding subsidiary gear first operative and then inoperative during the operation of said governing means in bringing any of the main gears into engagement, and a spring drive introduced to provide a limited amount of torsional freedom between said main and subsidiary gears.

4. In selective change-gear, the combination with a main driving-shaft, a counter-shaft rotated thereby, a main driven-shaft, a series of selectively engageable main gears whereby said driven shaft may be driven at a variety of speeds by and relative to said driving-shaft and counter-shaft, and operable means for governing said engagement and selection, of means whereby said shafts are brought to the correct relative rotations when any of said main gears are about to engage, comprising a corresponding series of subsidiary gears each potentially capable of connecting said shafts to rotate at the same relative speeds and directions as its corresponding main gear, friction clutches carried by the countershaft whereby each of said subsidiary gears may be rendered operative to so connect said shafts, means for controlling said friction-clutches, and means whereby said controlling means are operated by said governing means in such manner that the corresponding subsidiary gear will be rendered first operative and then inoperative during the operation of said governing means in bringing any of the main gears into engagement.

In testimony whereof I have signed my name to this specification.

EDGAR RICHARD WILLIAMS.

In the presence of—
  CYRIL CARLYM COATES,
  SIDNEY JAMES TRELEAVEN.